United States Patent
Nallapureddy et al.

(10) Patent No.: US 9,366,750 B2
(45) Date of Patent: *Jun. 14, 2016

(54) RADAR DETECTION AND DYNAMIC FREQUENCY SELECTION

(75) Inventors: Bhaskar V. Nallapureddy, Sunnyvale, CA (US); Tsunglun Yu, Cupertino, CA (US); Yungping Hsu, Saratoga, CA (US); Sek Kin Neng, Cupertino, CA (US)

(73) Assignee: Marvell World Trade LTD., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 12/761,937

(22) Filed: Apr. 16, 2010

(65) Prior Publication Data

US 2010/0202359 A1 Aug. 12, 2010

Related U.S. Application Data

(63) Continuation of application No. 11/410,938, filed on Apr. 25, 2006, now Pat. No. 7,702,044.

(60) Provisional application No. 60/742,480, filed on Dec. 5, 2005.

(51) Int. Cl.
*H04L 27/06* (2006.01)
*G01S 7/02* (2006.01)

(52) U.S. Cl.
CPC *G01S 7/021* (2013.01); *G01S 7/023* (2013.01)

(58) Field of Classification Search
CPC .......... G01S 7/021; G01S 7/023; H04K 3/226
USPC ............ 375/340, 252, 242, 244, 247; 342/13, 342/20; 455/227–229
See application file for complete search history.

(56) References Cited

U.S. PATENT DOCUMENTS 3,968,492 A 7/1976 Kaplan
7,024,188 B2 * 4/2006 Khun-Jush ............ H04W 16/14
                                                        342/18

(Continued)

FOREIGN PATENT DOCUMENTS

WO   WO-0101648 A1   1/2001
WO   WO-02091104 A2  11/2002

OTHER PUBLICATIONS 802.11n; IEEE P802.11-04/0889r6; Wireless LANs, TGn Sync Proposal Technical Specification; 131 pages.

(Continued)

*Primary Examiner* — Shuwang Liu
*Assistant Examiner* — Sung Ahn

(57) ABSTRACT

A method and apparatus for: receiving a radio frequency (RF) signal on a first channel; determining a radio signal strength of the RF signal; performing a correlation of the RF signal with a predetermined sequence of a wireless data packet to determine whether the RF signal contains the predetermined sequence; in response to the RF signal not containing the predetermined sequence, generating an indication that the RF signal is not a wireless data packet; and determining whether the radio signal strength of the RF signal exceeds a predetermined threshold. In response to i) the radio signal strength exceeding the predetermined threshold and ii) the indication being generated: measuring a parameter associated with the RF signal; determining whether the RF signal is a radar signal based on the parameter; and changing from the first channel in response to the RF signal being determined to be a radar signal.

7 Claims, 19 Drawing Sheets

(56) References Cited

U.S. PATENT DOCUMENTS

| | | | | |
|---|---|---|---|---|
| 7,129,884 | B1* | 10/2006 | Tehrani | G01S 7/021 |
| | | | | 342/13 |
| 7,155,230 | B2* | 12/2006 | Tsien | G01S 7/021 |
| | | | | 455/226.2 |
| 7,522,669 | B2* | 4/2009 | Husted | H03G 3/3068 |
| | | | | 375/252 |
| 7,702,044 | B2* | 4/2010 | Nallapureddy | G01S 7/023 |
| | | | | 342/13 |
| 2003/0201382 | A1 | 10/2003 | Doh et al. | |
| 2003/0206130 | A1* | 11/2003 | Husted | G01S 7/021 |
| | | | | 342/57 |
| 2005/0059364 | A1* | 3/2005 | Hansen | G01S 7/021 |
| | | | | 455/127.4 |
| 2005/0210157 | A1 | 9/2005 | Sakoda | |
| 2006/0258296 | A1* | 11/2006 | Steer | G01S 7/021 |
| | | | | 455/67.13 |

OTHER PUBLICATIONS

ANSI/IEEE Std. 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 528 pages.

Communication and extended European Search Report from the European Patent Office dated Jun. 4, 2007 for Application No. 06 020 170.4-12448; 8 pages.

IEEE 802.20-PD-06, IEEE P802.20 V14 (Jul. 16, 2004; 24 pages), Draft 802.20 Permanent Document, System Requirements for IEEE 802.20 Mobile Broadband Wireless Access Systems—Version 14.

IEEE Std 802.11a-1999 (Supplemental to IEEE Std 802.11-1999) [Adopted by ISO/IEC and redesignated as ISO/IEC 8802-11: 1999/ Amd 1:2000€] Supplement to IEEE Standard for information technology—Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

IEEE Std 802.11b-1999 (Supplement to IEEE 802.11-1999 Edition); Supplement to IEEE Standard for information technology—Telecommunications and information exchange between systems—Local and metropolitan area networks—Specific requirements—Part 11: Wireless LAN Medium Access Control (MAC) and Physical Layer (PHY) specifications; Higher-Speed Physical Layer Extension in the 2.4 GHz Band; LAN/MAN Standards Committee of the IEEE Computer Society; Sep. 16, 1999 IEEE-SA Standards Board; 96 pages.

IEEE Std 802.11g/D2.8, May 2002 (Supplement to ANSI/IEEE Std 802.11, 1999 Edition) Draft Supplement to Standard [for] information technology—telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band; LAN/MAN Standards Committee of the IEEE Computer Society; 53 pages.

IEEE Std 802.11h-2003 (Amendment to IEEE Std 802.11, 1999 Edition (Reaff 2003)): IEEE Standard for information technology—Telecommunications and information exchange between systems—Local and metropolitan area networks—Specific requirements: Part 11: Wireless LAN Medium Access Control (MAC) and Physical Layer (PHY) Specifications, Amendment 5, Spectrum and Transmit Power Management Extensions in the 5 GHz band in Europe; IEEE Computer Society, Sponsored by the LAN/MAN Standards Committee; Oct. 14, 2003; 74 pages.

IEEE Std 802.16-2004 (Revision of IEEE Std 802.16-2001) IEEE Standard for Local and metropolitan area networks; Part 16: Air Interface for Fixed Broadband Wireless Access Systems; IEEE Computer Society and the IEEE Microwave Theory and Techniquest Society; Oct. 1, 2004; 893 pages.

Kerry, S.J. et al; "Liaison Statement on the compatibility between IEEE 802.11a and radars in the Radiolocation and the Radionavigation service in the 5250-5350 MHz and 5470-5725 MHz bands", Internet Citation, Jan. 17, 2001; 6 pages.

* cited by examiner

| Maximum Transmit Power | Value |
|---|---|
| ≥ 200 mW | -64 dBm (Access Point) |
| < 200 mW | -62 dBm (Client Station) |

*FIG. 3*

| Parameter | Value |
|---|---|
| Non-occupancy period | 30 minutes |
| Channel Availability Check Time | 60 s |
| Channel Move Time | 10 s |
| Channel Closing Transmission Time | 200 ms + approx. 60 ms over remaining 10 s period |

*FIG. 4*

| Radar Bin Index | Pulse Width (PW) in μsec | Pulse Repetition Interval (PRI) in μsec |
|---|---|---|
| 1 | 1 | 1428 |
| 2 | 1-5 | 150-230 |
| 3 | 6-10 | 200-500 |
| 4 | 11-20 | 200-500 |

*FIG. 7*

RADAR DETECTION AND DYNAMIC FREQUENCY SELECTION

CROSS-REFERENCE TO RELATED APPLICATIONS

This application is a continuation of U.S. patent application Ser. No. 11/410,938, filed Apr. 25, 2006, which claims the benefit of U.S. Provisional Application No. 60/742,480, filed Dec. 5, 2005. The disclosures of the above applications are incorporated herein by reference in their entirety.

FIELD OF THE INVENTION

The present invention relates to radar systems, and more particularly to radar detection algorithms.

BACKGROUND OF THE INVENTION

Radar is an acronym for Radio Detection and Ranging. The term "radio" refers to a radio frequency (RF) wave called a carrier of frequency $f_c$ that is modulated to form a radar pulse train. The detection and ranging part of the acronym refers to timing a delay between transmission of an RF pulse and its subsequent return. If the time delay is $\Delta t$, a range of the radar may be determined by the formula:

$$R = c\Delta t/2$$

where $c=3\times10^8$ m/s and is the speed of light. The factor of two in the formula accounts for the return trip.

Referring now to FIG. 1, a radar burst comprises a plurality of radar pulses. A pulse width (PW) of a radar pulse is the duration of the radar pulse. A pulse repetition interval (PRI) is an interval between the start of one radar pulse and the start of a subsequent radar pulse. A pulse repetition frequency (PRF) is the number of radar pulses transmitted per second and is equal to the inverse of PRI.

Military organizations use radar communication systems. Until recently, military radar communication systems enjoyed nearly interference-free communication. In recent years, however, wireless network communications have proliferated. As a result, wireless network signals may interfere with military radar communications. Interference between publicly used wireless networks and military radar systems is undesirable for security reasons.

Based on the disclosures by the military organizations, IEEE has defined the IEEE 802.11h specification, which is incorporated herein by reference in its entirety. IEEE 802.11h attempts to limit wireless networks and wireless network devices from interfering with radar systems. Support for IEEE 802.11h is required in all IEEE 802.11a compliant access points and client stations to avoid interference with military radar. One of the techniques IEEE 802.11h uses to reduce radio interference is Dynamic Frequency Selection (DFS).

Generally, when a device that employs DFS detects other devices on the same radio channel, the device switches to another channel if necessary. Typically, an access point (AP) in a wireless network transmits beacons and informs the client stations that the AP uses DFS. When the client stations detect radar on a channel, the client stations notify the AP. Based on this information, the AP uses DFS to select the best channel for network communications that will not interfere with radar.

Some network devices, however, may falsely detect radar on a channel. For example, a client station may incorrectly conclude that a noise signal such as a signal generated by a microwave appliance or other device is a radar signal. The network will unnecessarily block the channel despite the fact that the detected signal is not a radar signal. As false detections increase, additional channels may be blocked and fewer channels will remain available for network communications. This can significantly degrade network performance.

SUMMARY OF THE INVENTION

A wireless network device comprises a correlation module that correlates a predetermined portion of a radio frequency (RF) signal and that generates a correlation signal based thereon. The wireless network device comprises an automatic gain control (AGC) module that generates a gain control signal based on the RF signal. The wireless network device comprises a control module that selectively determines whether the RF signal is a radar signal based on the correlation signal and the gain control signal.

In another feature, the control module determines whether the RF signal is a radar signal when the correlation signal indicates that the RF signal is not a packet of wireless data. The control module determines whether the RF signal is a radar signal when the gain control signal indicates that a gain of the AGC module exceeds a predetermined threshold.

In another feature, the wireless network device further comprises a converter module that converts the RF signal to a digital RF signal, wherein the control module generates a reset signal that resets the AGC module when an output of the converter module decreases to less than a predetermined value.

In another feature, the control module determines a pulse width of a pulse of the RF signal based on a time difference between the gain control signal and the reset signal that follows the gain control signal. The control module determines that the RF signal is a radar signal when the pulse width for a predetermined number of adjacent pulses of the RF signal is substantially equal to a pulse width of a predetermined radar pulse.

In another feature, the control module divides an output of the converter module into N equal segments during a period between the gain control signal and the reset signal that follows the gain control signal, where N is an integer greater than one. The control module counts a number of zero-crossings in each of the N segments. The control module determines that the RF signal is one of a single tone radar signal and a chirp radar signal based on the number of zero-crossings in the N segments. The control module determines that the RF signal is a chirp radar signal when the number of zero-crossings in the N segments vary approximately linearly.

In another feature, the wireless network device further comprises a channel changing module that changes a communication channel of the network device when the control module determines that the RF signal is a radar signal.

In another feature, the wireless network device is an access point. In another feature, the wireless network device is a client station.

In another feature, the wireless network device further comprises a radio frequency (RF) receiver that receives the RF signal. The wireless network device complies with at least one of IEEE 802.11, 802.11a, 802.11b, 802.11g, 802.11h, 802.11n, 802.16, and 802.20 standards.

In still other feature, a method for detecting radar comprises correlating a predetermined portion of a radio frequency (RF) signal, generates a correlation signal based thereon, generating a gain control signal based on the RF signal, and selectively determining whether the RF signal is a radar signal based on the correlation signal and the gain control signal.

In another feature, the method further comprises determining whether the RF signal is a radar signal when the correlation signal indicates that the RF signal is not a packet of wireless data. The method further comprises determining whether the RF signal is a radar signal when the gain control signal indicates that a gain of an automatic gain control (AGC) module exceeds a predetermined threshold.

In another feature, the method further comprises converting the RF signal to a digital RF signal and generating a reset signal that resets an automatic gain control (AGC) module when the digital RF signal decreases to less than a predetermined value.

In another feature, the method further comprises determining a pulse width of a pulse of the RF signal based on a time difference between the gain control signal and the reset signal that follows the gain control signal. The method further comprises determining that the RF signal is a radar signal when the pulse width for a predetermined number of adjacent pulses of the RF signal is substantially equal to a pulse width of a predetermined radar pulse.

In another feature, the method further comprises dividing the digital RF signal into N equal segments during a period between the gain control signal and the reset signal that follows the gain control signal, where N is an integer greater than one, counting a number of zero-crossings in each of the N segments, and determining that the RF signal is one of a single tone radar signal and a chirp radar signal based on the number of zero-crossings in the N segments. The method further comprises determining that the RF signal is a chirp radar signal when the number of zero-crossings in the N segments vary approximately linearly.

In another feature, the method further comprises changing a communication channel when the RF signal is determined to be a radar signal.

In another feature, an access point comprises the method. In another feature, a client station comprises the method.

In another feature, the method further comprises receiving the RF signal. The method further comprises complying with at least one of IEEE 802.11, 802.11a, 802.11b, 802.11g, 802.11h, 802.11n, 802.16, and 802.20 standards.

In still other features, a wireless network device comprises correlation means for correlating a predetermined portion of a radio frequency (RF) signal and generating a correlation signal based thereon. The wireless network device comprises automatic gain control (AGC) means for generating a gain control signal based on the RF signal. The wireless network device comprises control means for selectively determining whether the RF signal is a radar signal based on the correlation signal and the gain control signal.

In another feature, the control means determines whether the RF signal is a radar signal when the correlation signal indicates that the RF signal is not a packet of wireless data. The control means determines whether the RF signal is a radar signal when the gain control signal indicates that a gain of the AGC means exceeds a predetermined threshold.

In another feature, the wireless network device further comprises converter means for converting the RF signal to a digital RF signal, wherein the control means generates a reset signal that resets the AGC means when an output of the converter means decreases to less than a predetermined value.

In another feature, the control means determines a pulse width of a pulse of the RF signal based on a time difference between the gain control signal and the reset signal that follows the gain control signal. The control means determines that the RF signal is a radar signal when the pulse width for a predetermined number of adjacent pulses of the RF signal is substantially equal to a pulse width of a predetermined radar pulse.

In another feature, the control means divides an output of the converter means into N equal segments during a period between the gain control signal and the reset signal that follows the gain control signal, where N is an integer greater than one. The control means counts a number of zero-crossings in each of the N segments. The control means determines that the RF signal is one of a single tone radar signal and a chirp radar signal based on the number of zero-crossings in the N segments. The control means determines that the RF signal is a chirp radar signal when the number of zero-crossings in the N segments vary approximately linearly.

In another feature, the wireless network device further comprises channel changing means for changing a communication channel of the network device when the control means determines that the RF signal is a radar signal.

In another feature, the wireless network device is an access point. In another feature, the wireless network device is a client station.

In another feature, the wireless network device further comprises radio frequency (RF) receiver means for receiving the RF signal. The wireless network device complies with at least one of IEEE 802.11, 802.11a, 802.11b, 802.11g, 802.11h, 802.11n, 802.16, and 802.20 standards.

In still other feature, a computer method for detecting radar comprises correlating a predetermined portion of a radio frequency (RF) signal, generating a correlation signal based thereon, generating a gain control signal based on the RF signal, and selectively determining whether the RF signal is a radar signal based on the correlation signal and the gain control signal.

In another feature, the computer method further comprises determining whether the RF signal is a radar signal when the correlation signal indicates that the RF signal is not a packet of wireless data. The computer method further comprises determining whether the RF signal is a radar signal when the gain control signal indicates that a gain of an automatic gain control (AGC) module exceeds a predetermined threshold.

In another feature, the computer method further comprises converting the RF signal to a digital RF signal and generating a reset signal that resets an automatic gain control (AGC) module when the digital RF signal decreases to less than a predetermined value.

In another feature, the computer method further comprises determining a pulse width of a pulse of the RF signal based on a time difference between the gain control signal and the reset signal that follows the gain control signal. The computer method further comprises determining that the RF signal is a radar signal when the pulse width for a predetermined number of adjacent pulses of the RF signal is substantially equal to a pulse width of a predetermined radar pulse.

In another feature, the computer method further comprises dividing the digital RF signal into N equal segments during a period between the gain control signal and the reset signal that follows the gain control signal, where N is an integer greater than one, counting a number of zero-crossings in each of the N segments, and determining that the RF signal is one of a single tone radar signal and a chirp radar signal based on the number of zero-crossings in the N segments. The computer method further comprises determining that the RF signal is a chirp radar signal when the number of zero-crossings in the N segments vary approximately linearly.

In another feature, the computer method further comprises changing a communication channel when the RF signal is determined to be a radar signal.

In another feature, an access point comprises the computer method. In another feature, a client station comprises the computer method.

In another feature, the computer method further comprises receiving the RF signal. The computer method further comprises complying with at least one of IEEE 802.11, 802.11a, 802.11b, 802.11g, 802.11h, 802.11n, 802.16, and 802.20 standards.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 lists exemplary threshold values of signal strength that the present invention uses to detect radar and to perform DFS;

FIG. 4 lists various exemplary times within which a wireless network device detects radar and perform DFS according to the present invention;

FIG. 7 lists parameters of various exemplary short-pulse radar signals that may be used to detect radar and perform DFS according to the present invention;

DETAILED DESCRIPTION OF THE PREFERRED EMBODIMENTS

Figure 1:
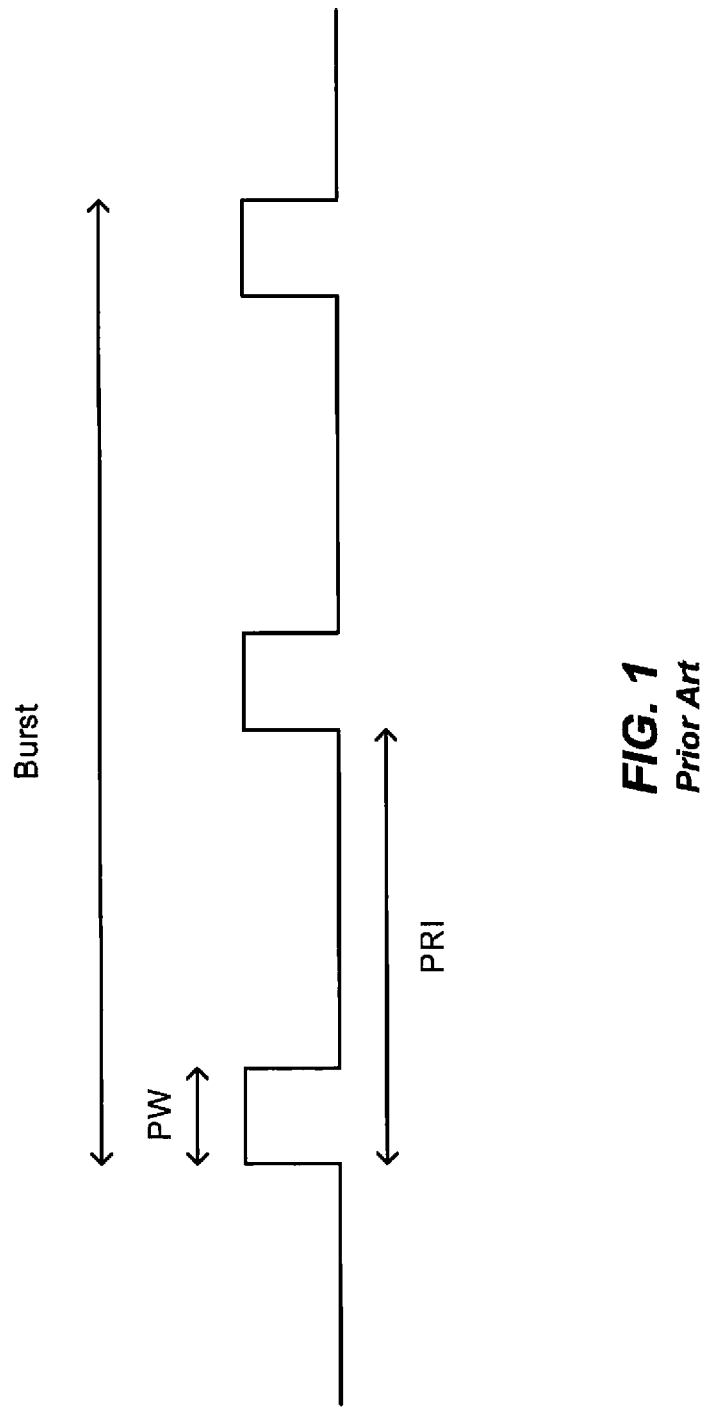
FIG. 1 shows an exemplary radar signal according to the prior art.

The following description of the preferred embodiment(s) is merely exemplary in nature and is in no way intended to limit the invention, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present invention.

Figure 2:
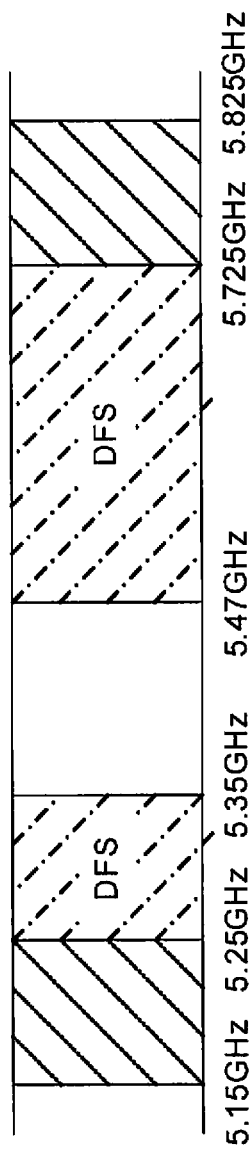
FIG. 2 shows the exemplary frequency bands wherein radar detection and dynamic frequency selection (DFS) may be employed according to the present invention.

Referring now to FIG. 2, dynamic frequency selection (DFS) is used to avoid interference between radar signals and wireless network communication systems operating in the 5 GHz band. Specifically, DFS is used to select a radar-free channel for wireless network communication from multiple non-overlapping channels in the 5.25-5.35 GHz and 5.47-5.725 MHz frequency ranges.

A table in FIG. 3 lists the threshold values set by the Federal Communications Commission (FCC) for avoiding interference between radar signals and wireless network communication. Thus, if a wireless network device detects a signal of strength exceeding −64 dBm in a channel used by the device, and if the interfering signal is indeed a radar signal, the device should quit using that channel.

A table in FIG. 4 lists DFS response requirements set by the FCC. Thus, once a wireless network device detects radar, the network should stop using that channel within a predetermined time, such as 10 seconds. Communication on that channel may be blocked for a subsequent period of time, such as half-an-hour.

Figure 5:
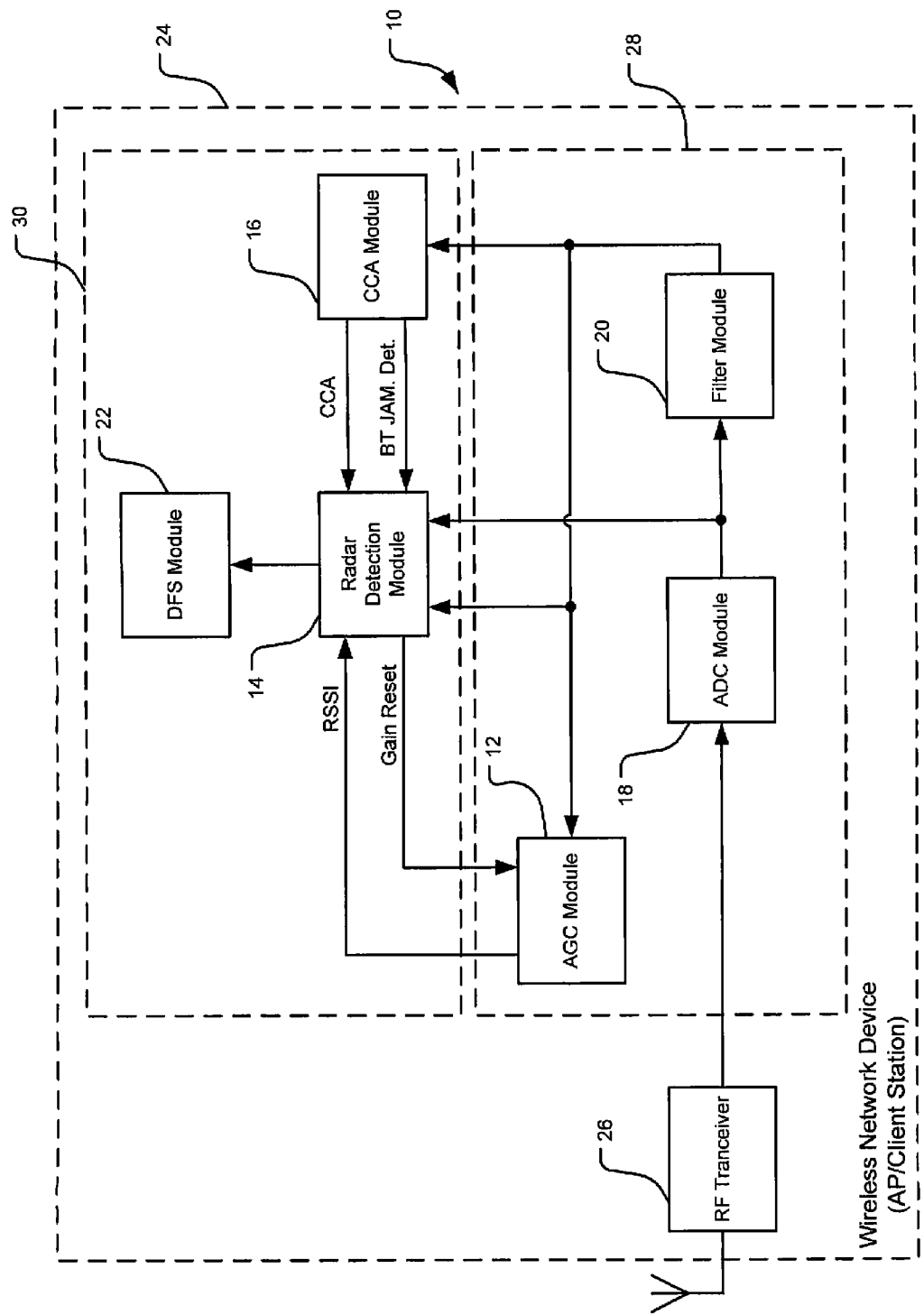
FIG. 5 is a functional block diagram of an exemplary system for detecting radar and performing DFS in a wireless network.

Referring now to FIG. 5, a system 10 for radar detection and DFS comprises an automatic gain control (AGC) module 12, a radar detection module 14, a clear channel assessment (CCA) module 16, an analog-to-digital converter (ADC) module 18, a filter module 20, and a dynamic frequency selection (DFS) module 22.

The AGC module 12 provides a radio signal strength indicator (RSSI) measurement to the radar detection module 14. Based on RSSI, the radar detection module 14 determines if a radio frequency (RF) signal is stronger than a predetermined threshold $DFS_{th}$ such as −64 dBm. The CCA module 16 distinguishes legitimate wireless data packets from other signals and activates the radar detection module 14 only if the RF signal is not a legitimate wireless data packet. The radar detection module 14 measures parameters of the RF signal such as pulse width, frequency, etc. The DFS module 22 compares the parameters measured by the radar detection module 14 with a set of parameters of known types of radar signals. The system 10 changes channel if the RF signal is a radar signal of a known type.

The system 10 may be implemented in a wireless network device 24 such as an access point or a client station. The wireless network device 24 typically comprises a RF transceiver module 26, a baseband processor (BBP) 28, and a medium access controller (MAC) module (or a control module) 30.

The RF transceiver 26 receives RF signals. The BBP module 28 demodulates, digitizes, and filters the RF signal. The BBP module 26 may comprise the AGC module 12, the ADC module 18, and the filter module 20. The control module 30 may comprise the radar detection module 14, the CCA module 16, and the DFS module 22.

In some implementations, the radar detection module 14, the CCA module 16, and the DFS module 22 may be implemented in the BBP module 26 of the wireless network device 24. In still other implementations, at least one of the modules may be implemented by firmware and/or software. Although shown separately for illustrative purposes, at least one of the modules shown in FIG. 5 may be implemented using a single module.

IEEE sections 802.11, 802.11(a), 802.11(b), 802.11(g), 802.11(h), 802.11(n), 802.16, 802.20, which are hereby incorporated by reference, define ways for configuring wireless networks and devices. According to these standards, a wireless network device may operate in either an an infrastructure mode or an ad-hoc mode.

Figure 6A:
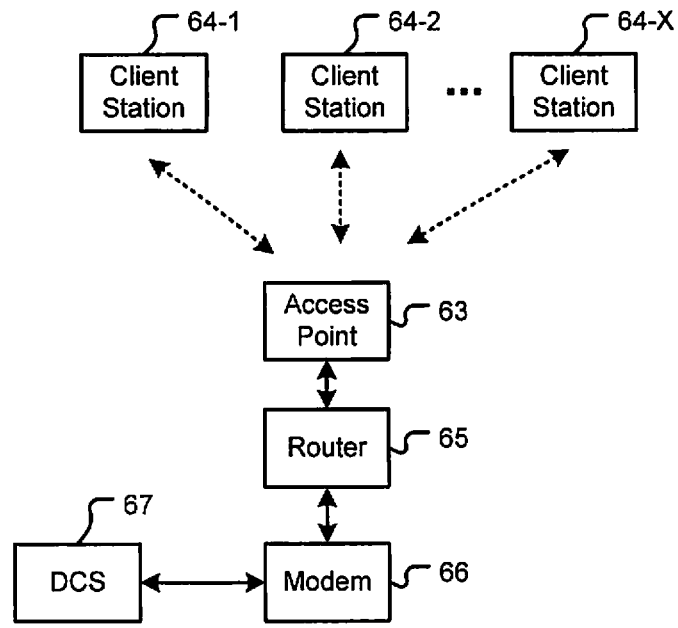
FIG. 6A shows client stations implementing the present invention and operating in a wireless network in an infrastructure mode.
Figure 6B:
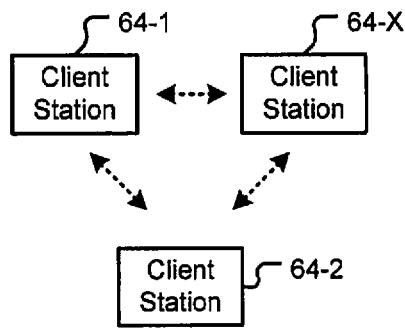
FIG. 6B shows an access point and client stations implementing the present invention and operating in a wireless network in an ad-hoc mode.

Referring now to FIGS. 6A-6B, various exemplary implementations of the system 10 in wireless networks are shown. In FIG. 6A, an infrastructure network is shown with wireless client stations 64-1, 64-2, . . . , and 64-X (collectively 64) that communicate with an access point 63. The access point 63 may communicate with a router 65. A modem 66 may provide access to a distributed communications system (DCS) 67 such as the Internet, a wide area network (WAN), and/or a local area network (LAN). In FIG. 6B, the client stations 64-1, 64-2, . . . , and 64-X (collectively 64) are configured in an ad hoc mode. Either the AP 63 and/or the client stations 64 may comprise the system 10.

Radar signals may be generally classified into three categories: Short-pulse radar signals, long-pulse or chirp radar signals, and frequency-hopping radar signals. A table in FIG. 7 lists sample parameters for four exemplary short-pulse radar signals. In a chirp radar signal, the frequency of the carrier is linearly varied within radar pulses. For example, a typical chirp radar signal may have a pulse width (PW) of 50-100 μS, a pulse repetition interval (PRI) of 1-2 mS, and a chirp width of 5-20 MHz. A typical frequency-hopping radar signal may have a PW of 1 μS, a PRI of 333 μS, and 9 pulses per hop. Parameter values of radar signals used in actual applications may vary.

Figure 8A:
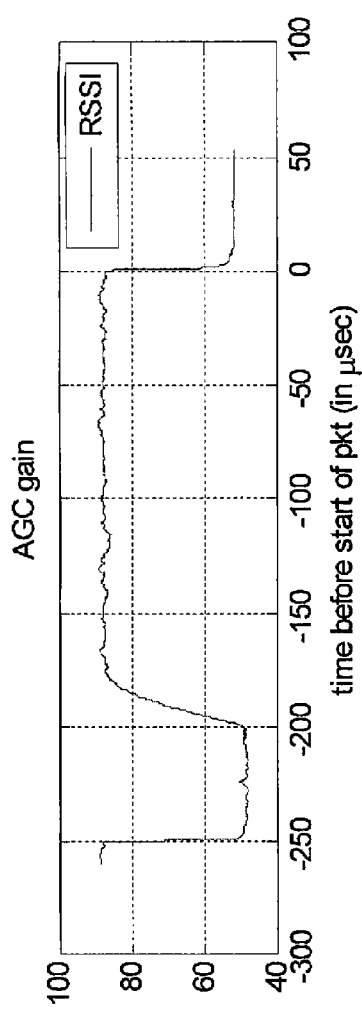
FIG. 8A shows an exemplary response of AGC gain to a chirp radar pulse followed by a wireless data packet according to the present invention.
Figure 8B:
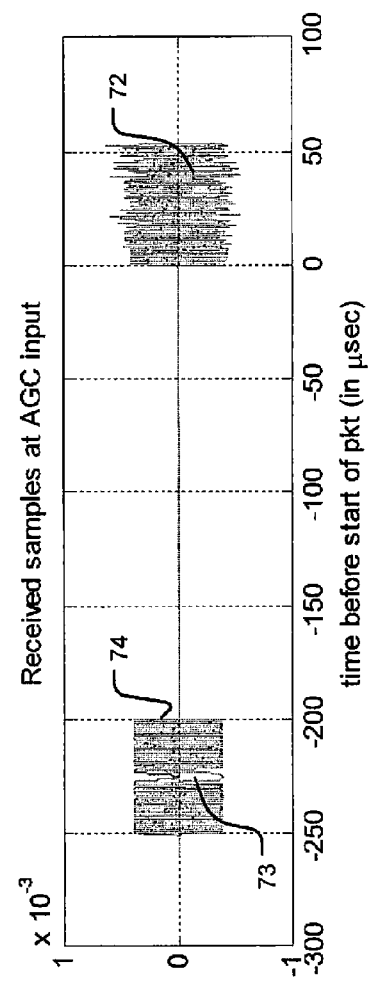
FIG. 8B shows exemplary samples of a chirp radar pulse and a wireless data packet received by an analog-to-digital converter (ADC), when automatic gain control (AGC) is off, according to the present invention.
Figure 9A:
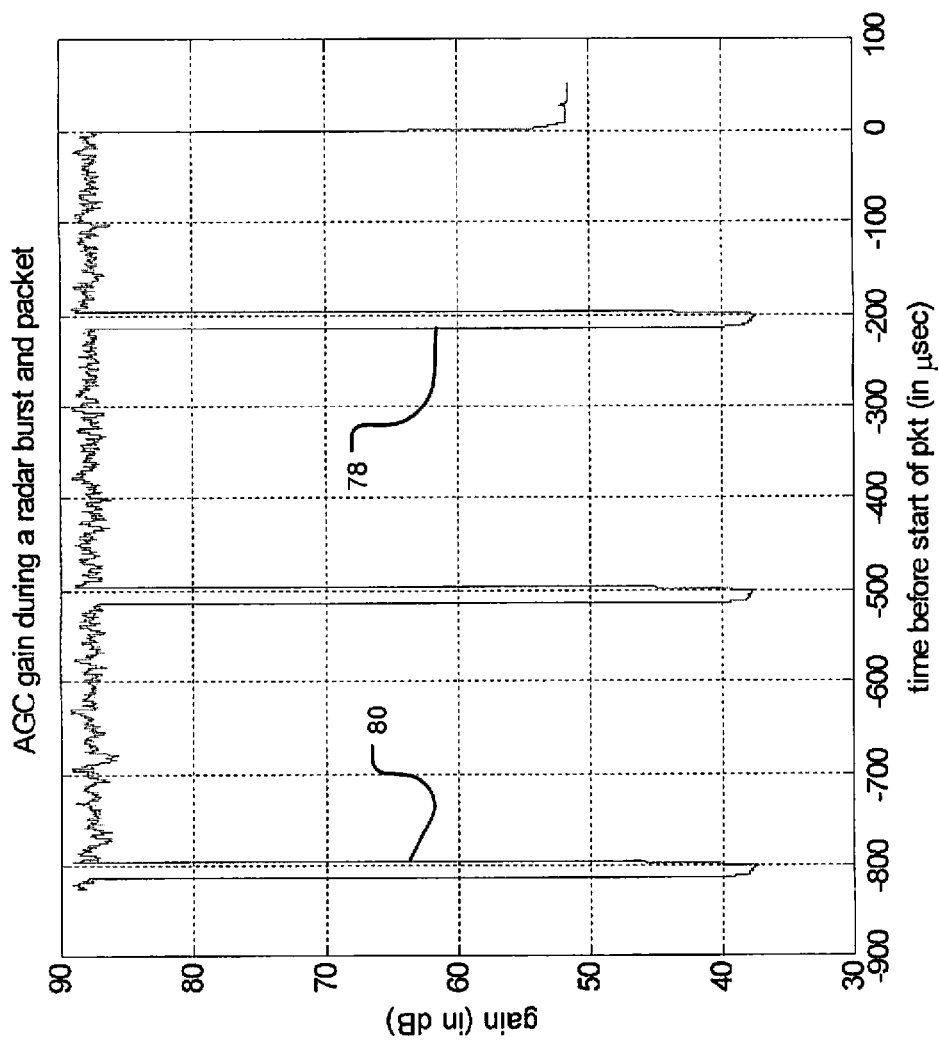
FIG. 9A shows an exemplary response of AGC gain to a burst of three radar pulses followed by a wireless data packet according to the present invention.
Figure 9B:
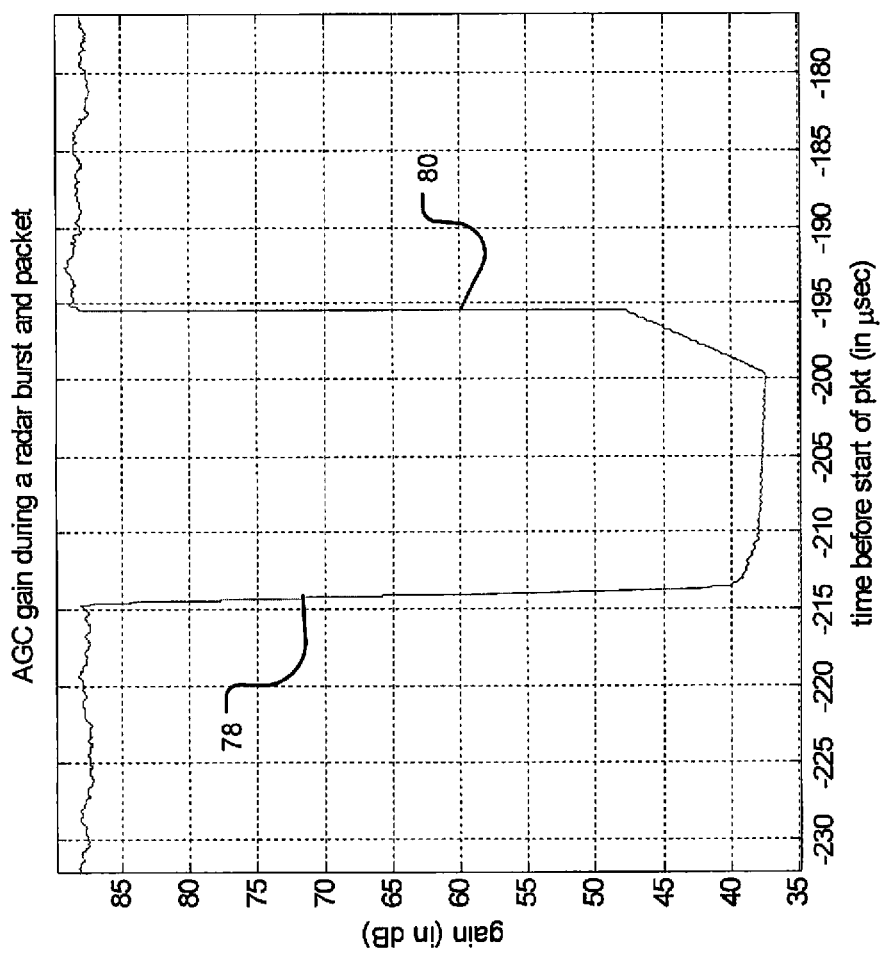
FIG. 9B shows an exemplary decrease and increase in AGC gain in response to a radar pulse according to the present invention.

Referring now to FIGS. 8A-9B, a response of AGC gain to different types of RF signals is shown. FIG. 8A shows a response of AGC gain to a chirp radar pulse followed by a wireless data packet. FIG. 8B shows exemplary samples of a chirp radar pulse 74 and a wireless data packet 72 received by the ADC module 18 when the AGC is off. FIG. 8B also shows a variation 73 in the signal input to the ADC module 18, when the AGC is off, corresponding to a varying frequency of chirp radar. FIG. 9A shows a response of AGC gain to a burst of three radar pulses followed by a wireless data packet. FIG. 9B shows in detail a decrease 78 and an increase 80 in AGC gain in response to a radar pulse.

When the RF transceiver 26 receives an RF signal, the gain of the AGC module 12 decreases to a value that is less than a normal value. The gain of the AGC module 12 returns to the normal value after a period of time. The time taken by the gain of the AGC module 12 to return to the normal value depends on various parameters of the RF signal such as signal strength, pulse width, frequency, etc. The AGC module 12 uses a radio signal strength indicator (RSSI) to indicate the strength of the RF signal to the radar detection module 14. If RSSI exceeds a threshold value $DFS_{th}$, such as −64 dBm, the radar detection module 14 performs radar detection.

The CCA module 16 determines whether the RF signal is a legitimate wireless data packet. A preamble in a legitimate wireless data packet comprises a standard sequence. The CCA module 16 performs a correlation on the sequence in the preamble to determine whether the RF signal is a legitimate wireless data packet. The CCA module 16 uses a CCA signal to activate the radar detection module 14 when the RF signal is not a legitimate wireless data packet. Thus, the CCA module 16 prevents false triggering of the radar detection module 14. That is, the CCA module 16 prevents the radar detection module 14 from performing radar detection and DFS when the RF signal is a legitimate wireless data packet. Additionally, the CCA module 16 prevents the radar detection module 14 from being falsely triggered by Bluetooth jammers.

The ADC module 18 converts the RF signal from an analog to a digital format. At the end of the RF signal, the output of the ADC module 18 decreases to a low value. The radar detection module 14 monitors the output of the ADC module 18. When the output of the ADC module 18 decreases below a predetermined threshold and remains below the predetermined threshold for a period of time, the radar detection module 14 detects an ADC under-run condition. The ADC under-run condition indicates an end of a pulse of the RF signal. The radar detection module 14 determines characteristics of the RF signal such as pulse width (PW), frequency, etc., based on the ADC under-run condition.

The filter module 20 typically comprises a low-pass filter that filters the output of the ADC module 18. The radar detection module 14 determines whether the RF signal is single tone radar or chirp radar based on the output of the filter module 20. Additionally, the radar detection module 14 determines the frequency of the RF signal based on the output of the filter module 20.

The radar detection module 14 measures parameters of the RF signal such as pulse width, frequency (e.g., chirp frequency, single tone frequency, etc.), and pulse repetition interval (PRI). The DFS module 22 compares the parameters measured by the radar detection module 14 to the exemplary parameters shown in the table in FIG. 7 to determine whether the RF signal is a radar signal of a known type.

Specifically, when the signal strength of the RF signal exceeds $DFS_{th}$ and when the CCA module 16 indicates that the RF signal is not a legitimate wireless data packet, the radar detection module 14 measures pulse width of every pulse of the RF signal as follows. The radar detection module 14 determines a beginning of a pulse based on the RSSI signal generated by the AGC module 12. The RSSI signal indicates a beginning of a pulse when the AGC gain crosses the −64 dBm threshold. An end of a pulse is indicated by the ADC under-run condition detected by the radar detection module 14 at the end of every pulse. The radar detection module 14 calculates the pulse width of the pulse by counting a difference between the time of the beginning of the pulse and the time of the end of the pulse.

Additionally, after receiving the ADC under-run signal at the end of the pulse, the radar detection module 14 generates a signal to reset the gain of the AGC module 12 to the normal value. Unless so reset, the gain of the AGC module 12 may take a long time to return to the normal value, and incoming data during that time period may be lost.

Figure 10:
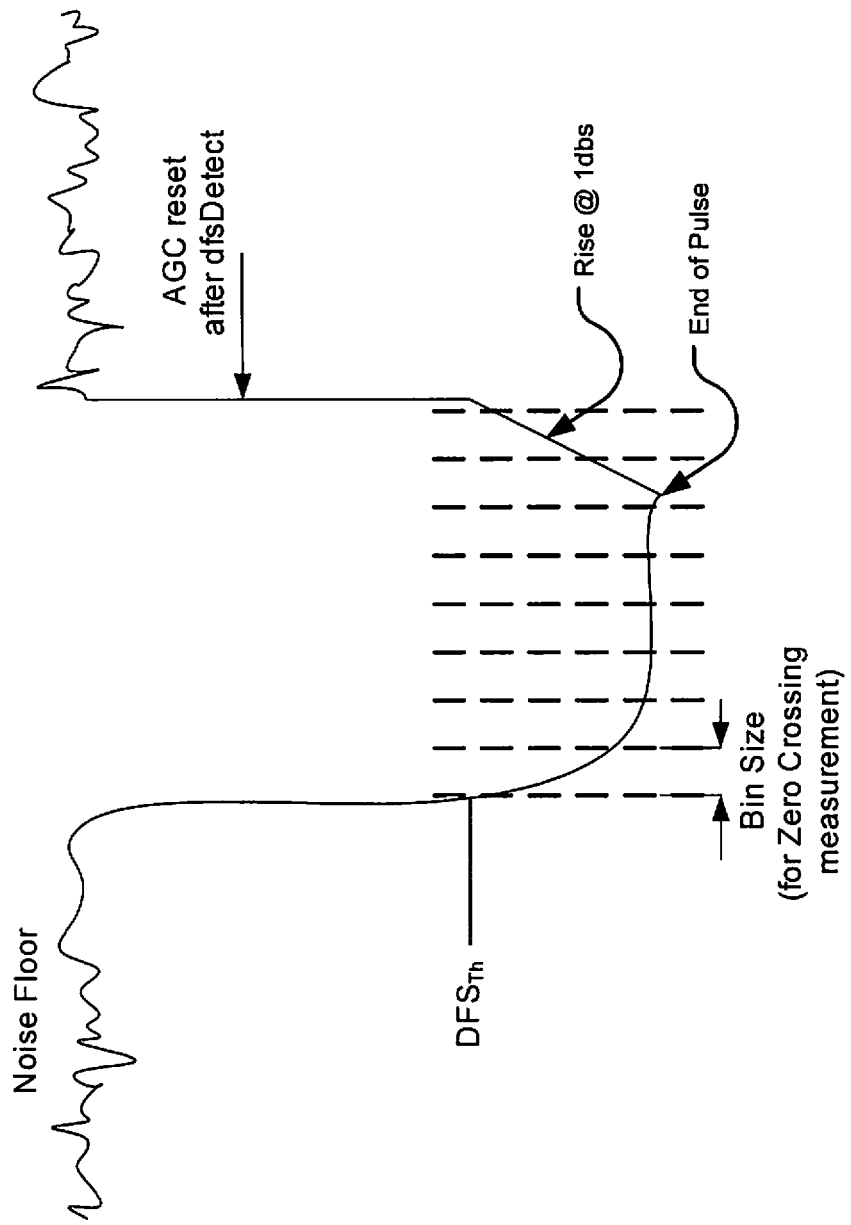
FIG. 10 shows an exemplary method for measuring frequency of a radar pulse according to the present invention.

Referring now to FIG. 10, the radar detection module 14 measures the frequency of the RF signal to determine whether the RF signal is a single tone radar signal or a chirp radar signal. When the gain of the AGC module 12 decreases to less than a predetermined threshold value $DFS_{th}$ (typically −64 dBm), the duration of the RF pulse is divided into multiple segments or areas called bins of equal time width. The number of bins is typically proportional to the pulse width. The width of each bin is proportional to the resolution of frequency measurement.

The radar detection module 14 measures the frequency of the RF signal in each bin. Numerous methods such as Fourier transforms (e.g., DFT, FFT), zero-crossing method, etc., may be used to measure the frequency. The radar detection module 14 uses the zero-crossing method since the zero-crossing method is less complex than Fourier Transforms.

Figure 11:
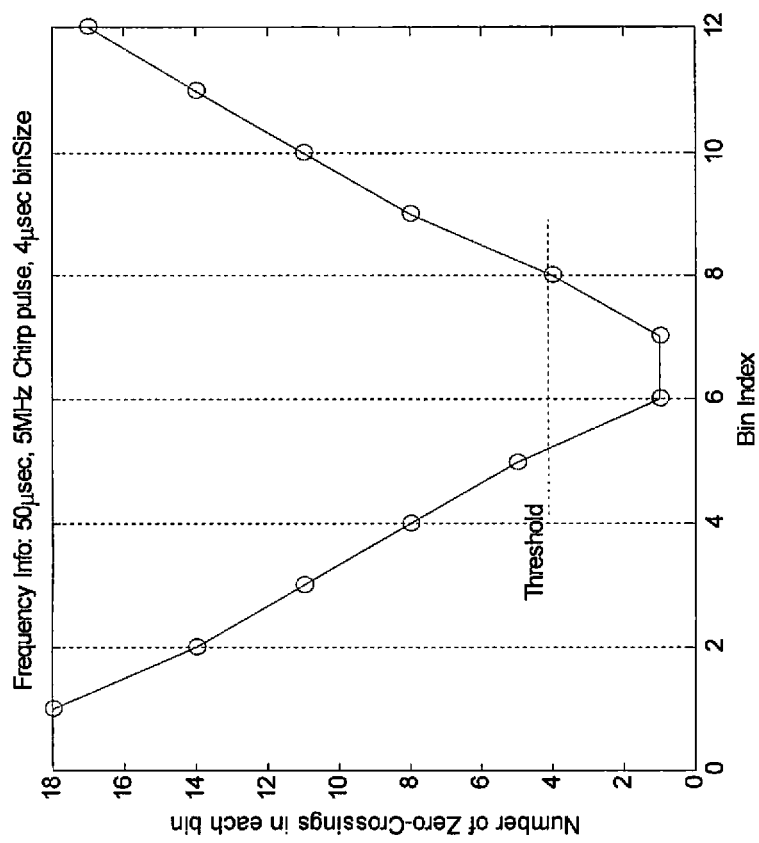
FIG. 11 is graph of number of zero-crossings in a bin as a function of number of bins according to the present invention.

Referring now to FIG. 11, the number of zero-crossings in each bin is plotted against bin index. The radar detection module 14 measures frequency by counting the number of zero-crossings inside the bins. The number of zero-crossings in a bin is directly proportional to the frequency of the RF signal in the bin. That is, the higher the frequency, the higher the number of zero-crossings. Specifically, a linear graph indicates a linear variation in the frequency. A linear variation in the frequency indicates that the RF signal may be chirp radar. Number of zero-crossings below a predetermined threshold is ignored since a very low number of zero-crossings may be sensitive to random noise.

Figure 12:
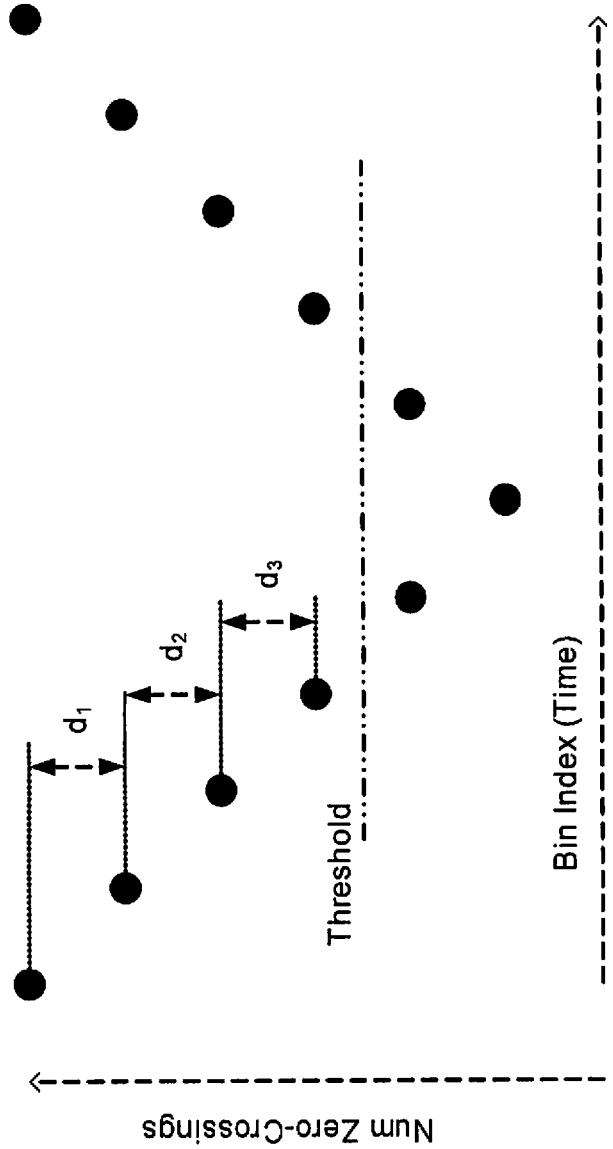
FIG. 12 is graph of number of zero-crossings in a bin as a function of number of bins when radar pulses are centered around carrier according to the present invention.
Figure 13:
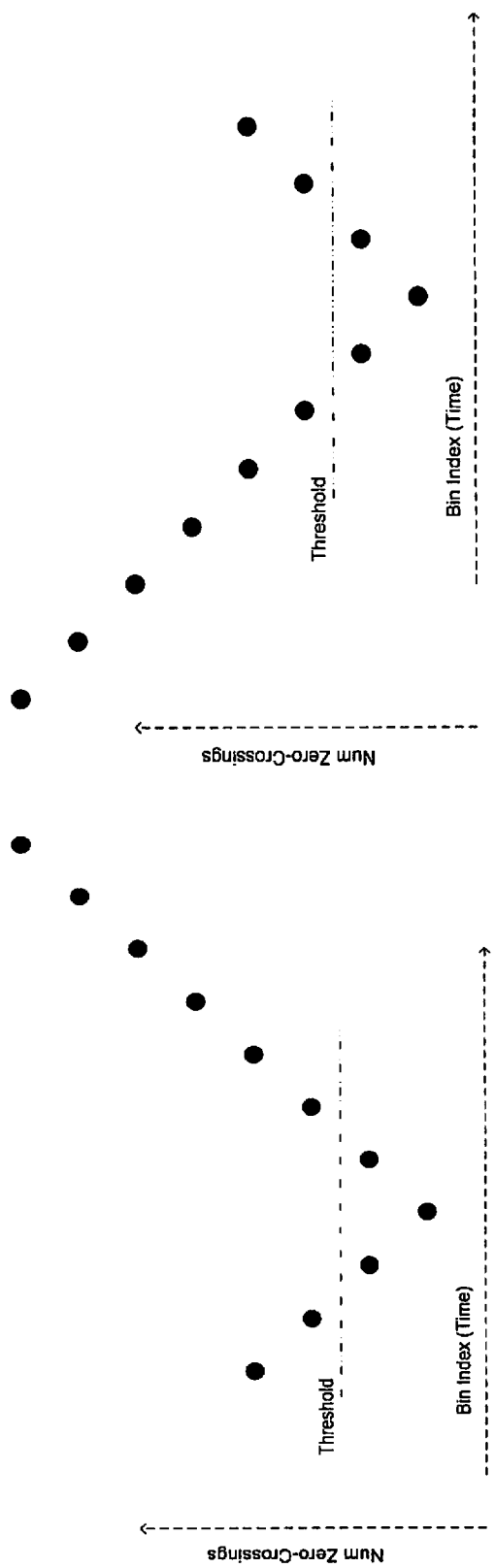
FIG. 13 is graph of number of zero-crossings in a bin as a function of number of bins when radar pulses are not centered around carrier according to the present invention.

Referring now to FIGS. 12-13, the radar detection module 14 determines whether the RF signal is chirp radar as follows. Initially, the radar detection module 14 determines if a difference $d_i$ between number of zero-crossings in adjacent bins exceeds a predetermined threshold. If true, the RF signal is not single tone radar and may be chirp radar. Otherwise, the radar detection module 14 determines that the RF signal is a single tone radar signal and generates an isTone signal.

The radar detection module 14 confirms whether the RF signal is chirp radar by further determining if an absolute value of $(d_i - d_{i-1})$ for all i's is less than a predetermined threshold. If true, the change in frequency is linear, and the RF signal is chirp radar. The radar detection module 14 generates an isChirp signal.

Thus, the radar detection module 14 determines if the RF signal is chirp radar if $d_i$ exceeds a predetermined threshold and if $abs(d_i - d_{i-1})$ is less than a predetermined threshold. FIG. 12 shows an even distribution of number of zero crossings when pulses of chirp radar are centered at center frequency of the DFS-enabled device that is receiving the radar signal. FIG. 13 shows an uneven distribution of number of zero crossings when pulses of chirp radar are not centered at center frequency of the DFS-enabled device that is receiving the radar signal.

The radar detection module 14 provides the DFS module 22 with measurements of parameters such as pulse width, frequency, pulse repetition interval (PRI) etc., for every pulse. The DFS module 22 determines whether the measured pulse widths for a predetermined number successive pulses are equal. If true, the DFS module 22 compares the measured pulse width with the exemplary pulse widths shown in the table in FIG. 7. If the measured pulse width matches a pulse width of a radar pulse of a known type, the DFS module 22 determines that the RF signal is a radar signal.

Additionally, the MAC module 30 provides the DFS module 22 with time stamps for each RF signal that causes the gain of the AGC module 12 to decrease to less than the $DFS_{th}$ threshold. The DFS module 22 determines if the time interval (spacing) between a predetermined number of successive pulses of the RF signal (i.e., the pulse repetition rate or PRI) is substantially equal. If true, the DFS module 22 compares the PRI with exemplary PRI values of radar signals such as those shown in the table in FIG. 7 to determine whether the RF signal is a radar signal.

If the DFS module 22 determines that the RF signal is a radar signal, the system 10 determines that the channel should be changed. The system 10 controls interruption of normal operation of the network device 24. The system 10 accomplishes this by not enabling radar detection and DFS in response to every RF interference received. Instead, the system 10 screens and qualifies an input RF signal before enabling radar detection and DFS. For example, the system 10 generates a dfsDetected signal to indicate that the network device 24 should change the channel if the received RF signal is a single tone radar or chirp radar with parameters that match those of known radar signals, or if the received RF signal is a pulse of a very short duration.

Figure 14:
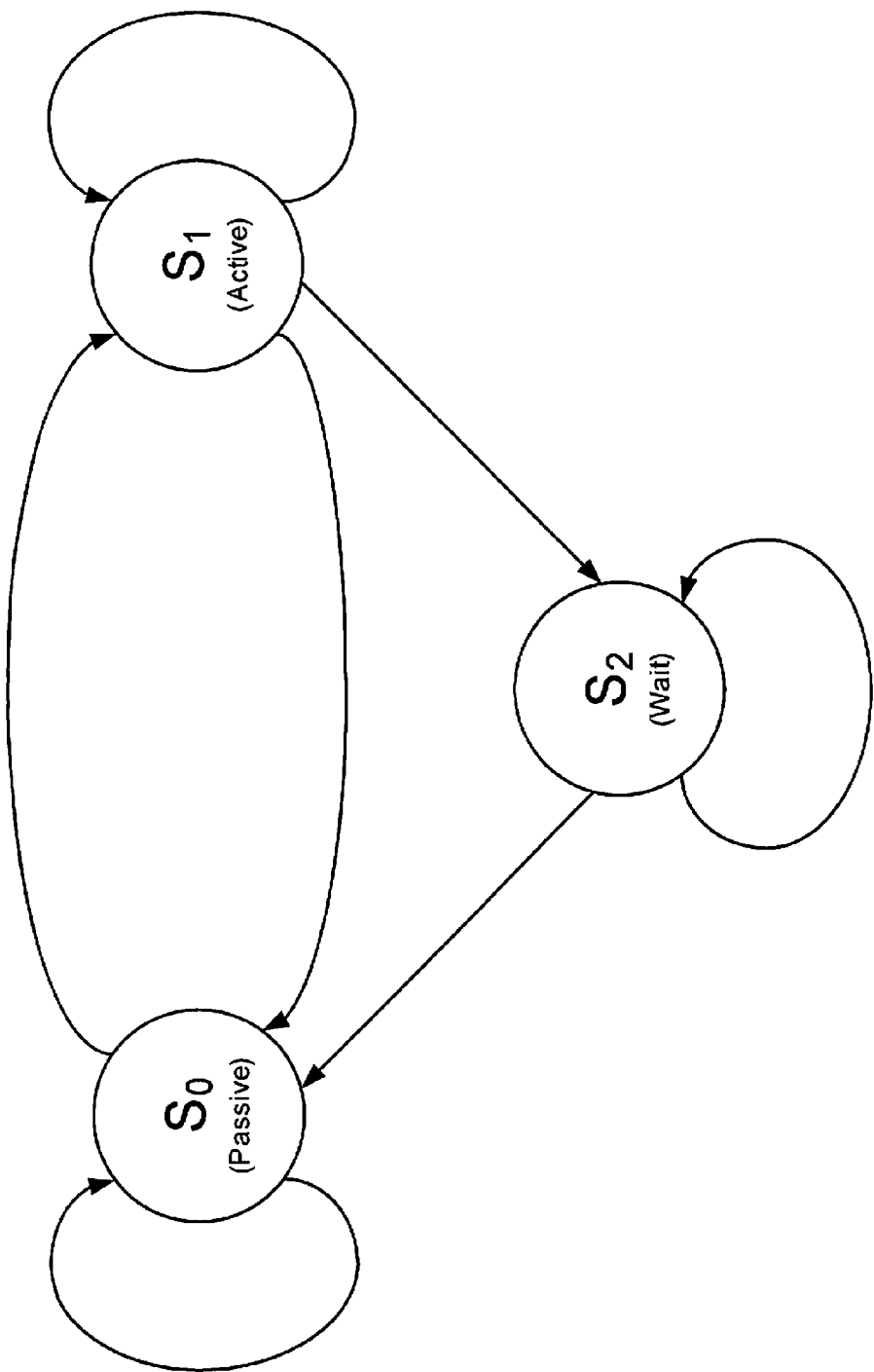
FIG. 14 is a state diagram of a finite DFS state machine according to the present invention.

Referring now to FIG. 14, a DFS finite state machine 100 has a passive (inactive) state $S_0$, an active state $S_1$, and a wait state $S_2$. The state machine 100 changes state from $S_0$ to $S_1$ when RSSI exceeds $DFS_{th}$ and remains in state $S_1$ unless the CCA module 16 confirms that a RF signal received is a legitimate wireless data packet. In state $S_1$, the state machine 100 measures parameters such as pulse width, frequency, etc., of the pulse of the RF signal.

The state machine 100 also determines in state $S_1$ if the RF signal is a single tone or a chirp radar signal. If true and if the parameters of the radar signal match the parameters of a known radar type, the state machine 100 indicates the type of radar signal detected (e.g., single tone or chirp) and that DFS is detected. At the end of the pulse, the AGC gain is reset to normal value, and the state machine returns to state $S_0$.

If the state machine 100 determines in state $S_1$ that the RF signal is not a radar signal of a known type, the state machine 100 waits in state $S_2$ until the interference ends or until the AGC gain is reset to normal value. The state machine 100 returns to state $S_0$. Depending on the parameter values of the known radar signals, the timing of each step in the state machine 100 can be programmed.

Figure 15:
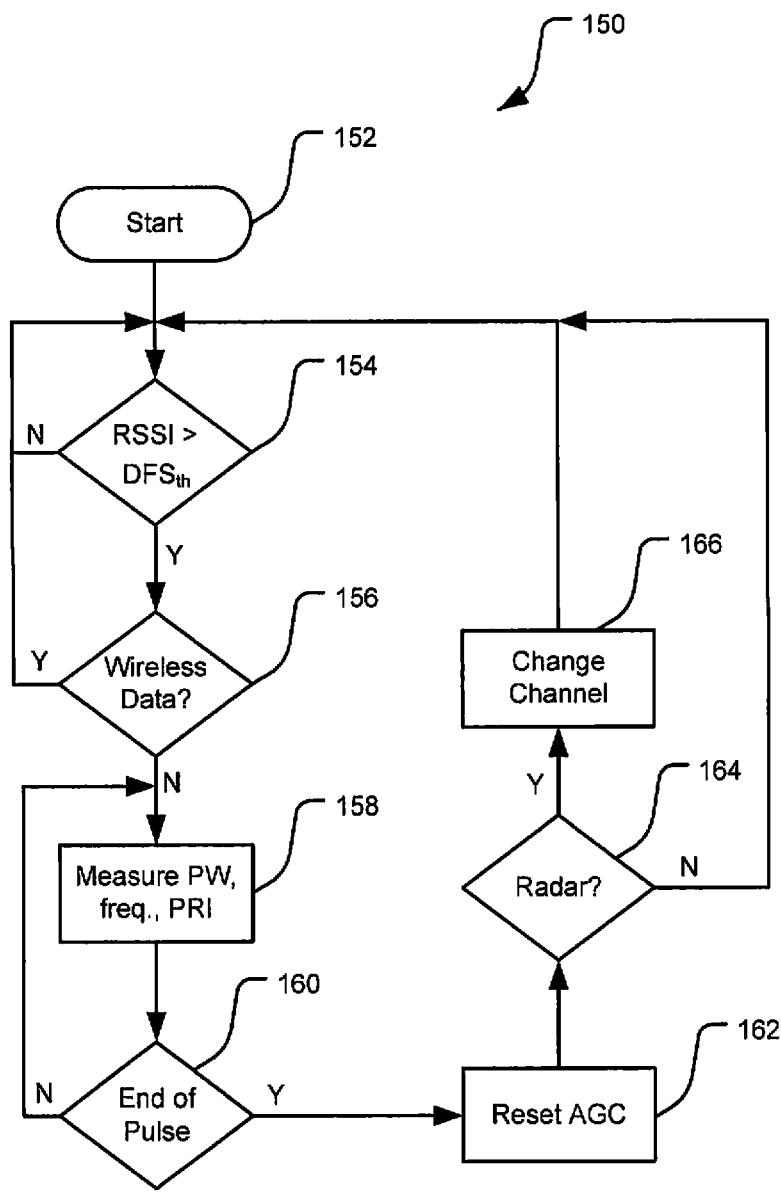
FIG. 15 is a flow chart of a method for radar detection and DFS according to the present invention.

Referring now to FIG. 15, a method 150 for radar detection and DFS begins at step 152. The radar detection module 14 determines whether the RSSI of an RF signal exceeds $DFS_{th}$ in step 154. If false, the method 150 returns to step 152. If true, the radar detection module 14 additionally determines in step 156 whether the RF signal received is a legitimate wireless data packet as indicated by the CCA module 16. If true, the method 150 returns to step 152. If false, the radar detection module 14 measures the parameters such as pulse width, frequency, etc., of the RF signal in step 158 until an end of pulse is detected in 160.

The radar detection module 14 resets the AGC gain in step 162 at the end of the pulse. The DFS module 22 compares the parameters measured by the radar detection module 14 to the exemplary parameters of radar signals of known types in step 164 and determines whether the RF signal is a radar signal of a known type. If true, the method 150 determines in step 166 that the channel should be changed. Otherwise, the method 150 returns to step 152.

Figure 16A:
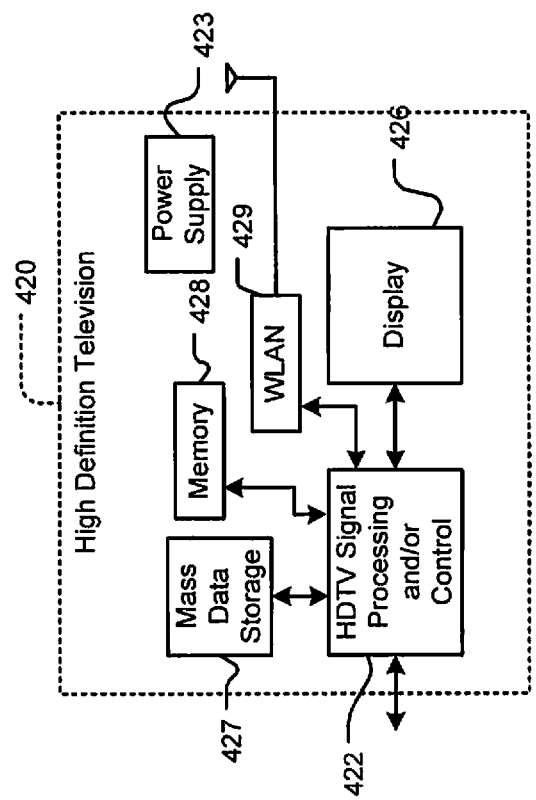
FIG. 16A is a functional block diagram of a high definition television.

Referring now to FIGS. 16A-16D, various exemplary implementations of the present invention are shown. Referring now to FIG. 16A, the present invention can be implemented in a high definition television (HDTV) 420. The present invention may be implemented in either or both signal processing and/or control circuits, which are generally identified in FIG. 16A at 422, and mass data storage 427 of the HDTV 420. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner in devices such as optical and/or magnetic storage devices. The devices may include, for example, hard disk drives HDD and/or DVDs. The HDD may be a mini HDD that includes one or more platters having a diameter that is smaller than approximately 1.8". The HDTV 420 may be connected to memory 428 such as RAM, ROM, low latency nonvolatile memory such as flash memory and/or other suitable electronic data storage. The HDTV 420 also may support connections with a WLAN via a WLAN network interface 429.

Figure 16B:
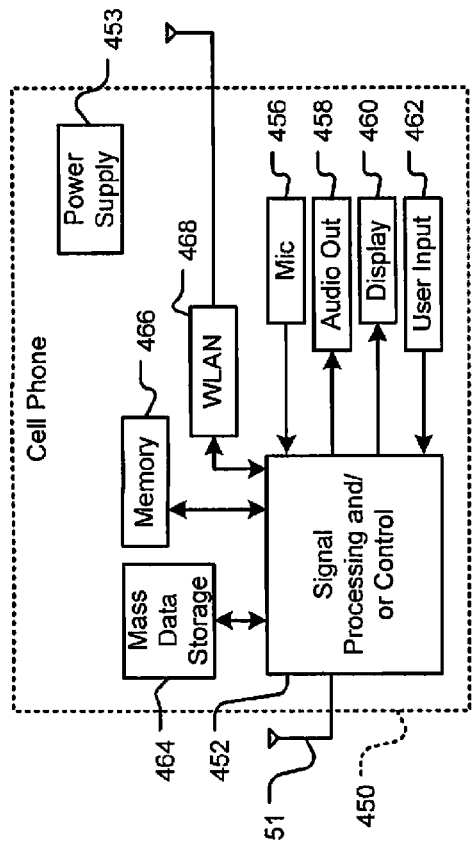
FIG. 16B is a functional block diagram of a cellular phone.

Referring now to FIG. 16B, the present invention can be implemented in a cellular phone 450 that may include a cellular antenna 451. The present invention may implement and/or be implemented in either or both signal processing and/or control circuits, which are generally identified in FIG. 16B at 452, and mass data storage 464 of the cellular phone 450. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner in devices such as optical and/or magnetic storage devices. The devices may include, for example, hard disk drives HDD and/or DVDs. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 also may support connections with a WLAN via a WLAN network interface 468.

Figure 16C:
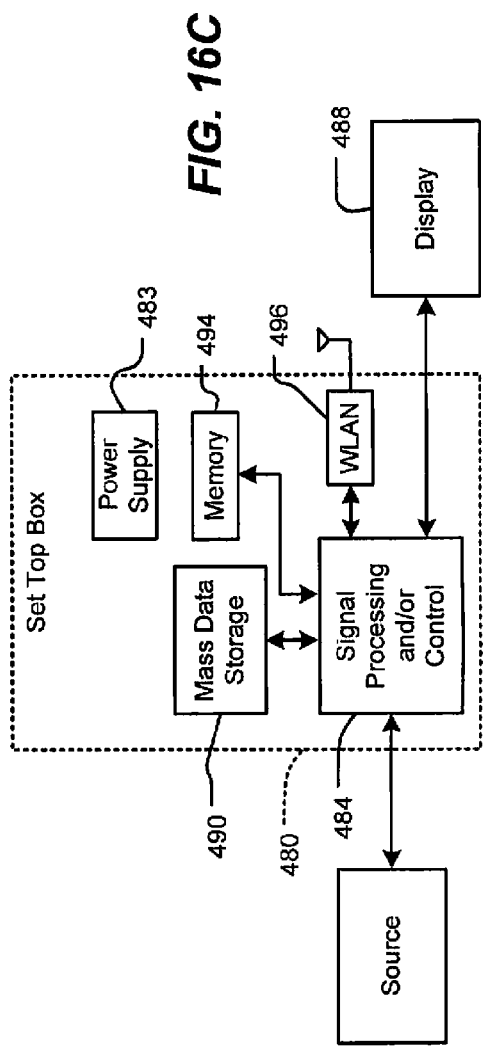
FIG. 16C is a functional block diagram of a set top box.

Referring now to FIG. 16C, the present invention can be implemented in a set top box 480. The present invention may be implemented in either or both signal processing and/or control circuits, which are generally identified in FIG. 16C at 484. The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices such as hard disk drives HDD and/or DVDs. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via a WLAN network interface 496.

Figure 16D:
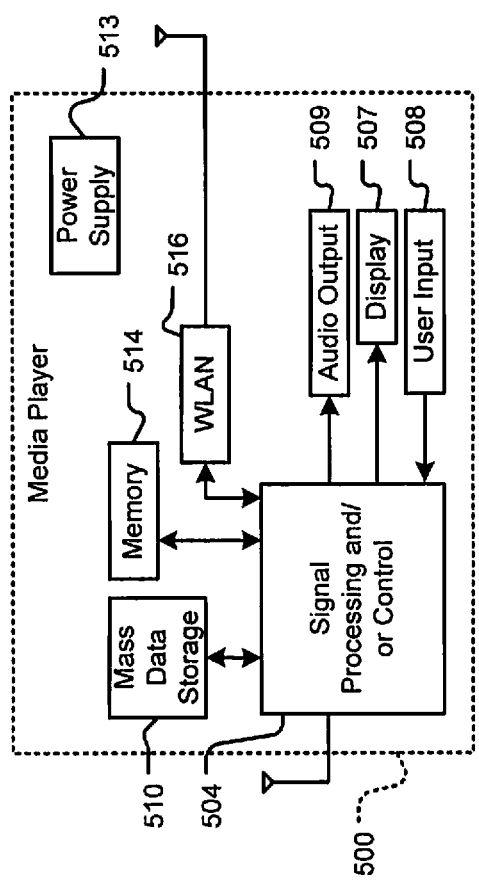
FIG. 16D is a functional block diagram of a media player.

Referring now to FIG. 16D, the present invention can be implemented in a media player 500. The present invention may be implemented in either or both signal processing and/or control circuits, which are generally identified in FIG. 16D at 504. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices such as hard disk drives HDD and/or DVDs. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via a WLAN network interface 516. Still other implementations in addition to those described above are contemplated.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:
1. A system comprising:
a radio frequency transceiver to receive a radio frequency signal on a first channel;
an automatic gain control circuit having a gain, wherein the gain i) changes from a normal value in response to the radio frequency transceiver receiving the radio frequency signal, and ii) subsequently returns to the normal value after a period of time, and wherein the automatic gain control circuit is configured to determine a radio signal strength of the radio frequency signal based on the period of time taken by the gain of the automatic gain control circuit to return to the normal value;

a clear channel assessment circuit to
- perform a correlation of the radio frequency signal with a predetermined sequence of a wireless data packet to determine whether the radio frequency signal contains the predetermined sequence, and
- in response to the radio frequency signal not containing the predetermined sequence, generate an indication that the radio frequency signal is not a wireless data packet;

a radar detector configured to determine whether the radio signal strength of the radio frequency signal exceeds a predetermined threshold;

a controller to, in response to i) the radio signal strength of the radio frequency signal exceeding the predetermined threshold and ii) the indication that the radio frequency signal is not a wireless data packet,
- divide the radio frequency signal into N equal segments, where N is an integer greater than one;
- count zero-crossings in each of the N equal segments;
- determine a difference between the zero-crossings in a first one of the N equal segments and the zero-crossings in a second one of the N equal segments;
- determine that the radio frequency signal is a chirp radar signal when the difference is greater than or equal to a predetermined zero-crossings threshold; and
- determine that the radio frequency signal is a tone radar signal when the difference is less than the predetermined zero-crossings threshold; and a dynamic frequency selection circuit to change channel from the first channel to a second channel in response to the radio frequency signal being determined to be a chirp radar signal or a tone radar signal.

2. The system of claim 1, wherein the predetermined threshold is −64 dBm.

3. The system of claim 1, wherein the system is implemented within a wireless network device.

4. The system of claim 3, wherein the wireless network device is configured in accordance with one or more wireless networking standards including IEEE 802.11, 802.11 (a), 802.11 (b), 802.11 (g), 802.11 (h), 802.11 (n), 802.16, and 802.20.

5. The system of claim 3, wherein the wireless networking device is implemented in a high-definition television, a cellular phone, a set top box, of media player.

6. A method comprising:

receiving a radio frequency signal on a first channel, wherein a gain of an automatic gain control module changes from a normal value in response to receiving the radio frequency signal, and ii) subsequently returns to the normal value after a period of time;

determining a radio signal strength of the radio frequency signal based on the period of time taken by the gain of the automatic gain control module to return to the normal value;

performing a correlation of the radio frequency signal with a predetermined sequence of a wireless data packet to determine whether the radio frequency signal contains the predetermined sequence;

in response to the radio frequency signal not containing the predetermined sequence, generating an indication that the radio frequency signal is not a wireless data packet;

determining whether the radio signal strength of the radio frequency signal exceeds a predetermined threshold;

in response to i) the radio signal strength of the radio frequency signal exceeding the predetermined threshold and ii) the indication that the radio frequency signal is not a wireless data packet,
- dividing the radio frequency signal into N equal segments, where N is an integer greater than one;
- counting zero-crossings in each of the N equal segments;
- determining a difference between the zero-crossings in a first one of the N equal segments and the zero-crossings in a second one of the N equal segments;
- determining that the radio frequency signal is a chirp radar signal when the difference is greater than or equal to a predetermined zero-crossings threshold; and
- determining that the radio frequency signal is a tone radar signal when the difference is less than the predetermined zero-crossings threshold; and changing from the first channel to a second channel in response to the radio frequency signal being determined to be a chirp radar signal or a tone radar signal.

7. The method of claim 6, wherein the predetermined threshold is −64 dBm.

* * * * *